United States Patent [19]

Pemberton

[11] 3,826,887
[45] July 30, 1974

[54] SIMPLIFIED PROCEDURE FOR TUNING PID CONTROLLERS

[75] Inventor: Troy J. Pemberton, Bartlesville, Okla.

[73] Assignee: Phillips Petroleum Company, Bartlesville, Okla.

[22] Filed: Dec. 29, 1971

[21] Appl. No.: 213,699

[52] U.S. Cl. ............................ 219/497, 219/501
[51] Int. Cl. .......................................... H05b 1/02
[58] Field of Search .................. 219/497, 499, 501; 318/609, 610, 621

[56] References Cited
UNITED STATES PATENTS

| | | | |
|---|---|---|---|
| 2,666,171 | 1/1954 | Williams et al. | 318/610 X |
| 2,830,244 | 4/1958 | Davis | 318/610 |
| 2,830,245 | 4/1958 | Davis et al. | 318/621 UX |
| 2,946,943 | 7/1960 | Nye et al. | 318/621 UX |
| 3,391,315 | 7/1968 | Schwartzenberg | 318/609 X |

Primary Examiner—J. D. Miller
Assistant Examiner—F. E. Bell
Attorney, Agent, or Firm—Neuman, Williams, Anderson and Olson

[57] ABSTRACT

Simplified procedures for tuning a PID controller are disclosed wherein variable circuit elements in the reset and rate networks are mechanically ganged together to permit simultaneous and proportionate control of the circuit parameters in those two networks.

15 Claims, 3 Drawing Figures

PATENTED JUL 30 1974   3,826,887

SIMPLIFIED PROCEDURE FOR TUNING PID CONTROLLERS

BACKGROUND OF THE INVENTION

This invention relates to automatic control apparatus and, in particular, provides simplified methods and apparatus for tuning PID controllers.

Automatic control systems are well known in the art. A field of study has grown up around the properties of such systems. They may range from the very simple, such as the classic example of a conventional thermostatic control system used to regulate room temperature in a house, to the very complex, such as a system used to operate a large chemical manufacturing plant essentially independent of human intervention.

In any automatic control system, there exists a process which must be controlled. In the residential heating example, that process might include the steps of supplying fuel to a burner, burning the fuel, transferring the generated heat to some fluid such as water or air, circulating that fluid throughout the house, and transferring the heat to the air in the house. The variable to be controlled is the room air temperature. In conventional, control system terminology, the process described is termed the controlled process and the room air temperature is termed the controlled variable. A thermostat is conventionally provided for regulating the controlled variable. It may include a dial mechanism for selecting the desired value of the controlled variable, the setpoint input. The thermostat reacts to the difference between the desired temperature and the actual temperature to produce an electric signal used to regulate the supply of fuel to the burner. The thermostat may be envisioned as performing two separate functions. First, it generates a signal related to the difference between the setpoint input and the controlled variable termed the error signal and, second, it performs some operation on the error signal to form what is known as the manipulated variable, here the signal applied to the burner. The second function of transferring the error signal into the manipulated variable is performed by a controller. It will be apparent that the nature of the controller used in any particular control system is very much dependent upon the nature of the controlled process.

A PID controller is a generalized type of controller which has been found to be useful with many types of controlled systems. Its characteristics have been extensively studied and documented in the past. Briefly, a PID controller is one in which the manipulated variable is proportional to the sum of the value of the error signal, an integral over time of the error signal, and a time derivative of the error signal. PID is an abbreviation for proportional plus integral plus derivative.

Making the manipulated variable responsive to a time integral of the error signal improves the steady state error characteristics of the control system. If the setpoint input is constant and the controlled variable is relatively constant with time, a relatively small difference between those quantities will generate a small error signal. If the error signal is sufficiently small, the controller may not respond to it. Integrating the error signal over time will effectively amplify a steady state error signal so that the controller will respond to it.

Making the manipulated variable responsive to a time derivative of the error signal improves the transient response of the control system. If either the setpoint input or the controlled variable changes relatively rapidly with time, the time derivative of the error signal will be of greater amplitude than the error signal and thus the response of the manipulated variable to such a change will be significantly increased.

The apparatus within the controller which provides the described integrating action of the error signal is often referred to as the reset apparatus or reset network. The apparatus within the controller which provides the described differentiating action of the error signal is often referred to as the rate apparatus or rate network.

In designing a PID controller for use in a particular control system, it will be apparent that the ratio in which the proportional signal, the integral signal, and the derivative signals are combined will have to be adjusted to optimize the operation of the control system. These ratios are determined by two constants built into the controller, commonly known as the reset time and the rate time. The significance of these constants will be more fully explained subsequently. The process of selecting the values of the reset and rate times for use in a specific control system is conventionally referred to as tuning the controller. Often it is not easy to mathematically determine the optimum values of the constants. This may be because of the difficult nature of the required mathematical manipulations, or it may be because of an imperfect understanding of the nature of the controlled process. Further, there are a number of different criteria which may be used to determine whether the control system operation is optimized and in any particular system it may be unclear which criteria should be used. In such cases, the controller is often tuned empirically by setting up the control system and adjusting the values of the controller constants until satisfactory operation of the system is obtained.

Such empirical tuning processes are often carried out by persons who are relatively knowledgeable about the nature of the controlled process but have relatively little skill in the analysis of control systems. It has been found that such persons often understand the nature of the compensation produced by the controller integral or reset action and thus have little difficulty adjusting the reset time to a satisfactory value. However, they often have very little comprehension of the nature of the compensation produced by the controller derivative or rate action. Alternatively, the person tuning the controller may understand the rate action, but have no readily available means for ascertaining the degree to which the control system transient response is improved thereby. In either case, it has been found that the person tuning the controller will often simply set the rate time to zero completely defeating the controller rate action and the benefits to be gained thereby.

SUMMARY OF THE INVENTION

This invention provides simplified methods and apparatus for tuning a PID controller wherein the reset and rate times are simultaneously adjusted and, preferably, are maintained in a fixed ratio so that adjustment of one of those constants results in an automatic proportionate adjustment of the other constant. Additionally, the fixed ratio between the reset and rate times may be altered in accord with alterations in the criteria by which optimum operation of the control system including the controller is determined. The invention thus yields a procedure for tuning a PID controller wherein the rate and reset time constants may be tuned simultaneously to optimize the control system by ganging together the variable circuit elements operative to alter the reset and rate times.

Thus, it is an object of this invention to provide simplified methods and apparatus for tuning controllers.

It is an object of this invention to provide apparatus for tuning a PID controller wherein the reset and rate times are simultaneously altered.

It is an object of this invention to provide a procedure for tuning a PID controller wherein the reset time and the rate time are maintained in a constant ratio.

It is an object of this invention to provide apparatus for tuning a PID controller wherein elements for adjusting the reset time and rate time are maintained in a predetermined physical relationship to keep the reset time and rate time in a constant ratio.

It is an object of this invention to provide apparatus for tuning a PID controller wherein elements for adjusting the reset time and rate time are maintained in a predetermined physical relationship to keep the reset time and rate time in a constant ratio and wherein said constant ratio may be adjusted.

It is an object of this invention to provide a PID controller having only two tuning adjustments.

It is an object of this invention to provide an electronic PID controller having variable circuit elements for adjusting the reset and rate times wherein said variable circuit elements are ganged together to maintain the ratio between the reset and rate times at a predetermined value.

It is an object of this invention to provide an electronic PID controller having variable circuit elements for adjusting the reset and rate times wherein said variable circuit elements are ganged together to maintain the ratio between the reset and rate times at a predetermined value and said predetermined value may be altered by adjusting other variable circuit elements.

Other objects of this invention will be apparent from the following description of the preferred embodiments and the appended claims and drawings.

DESCRIPTION OF THE PREFERRED EMBODIMENTS

Figure 1:
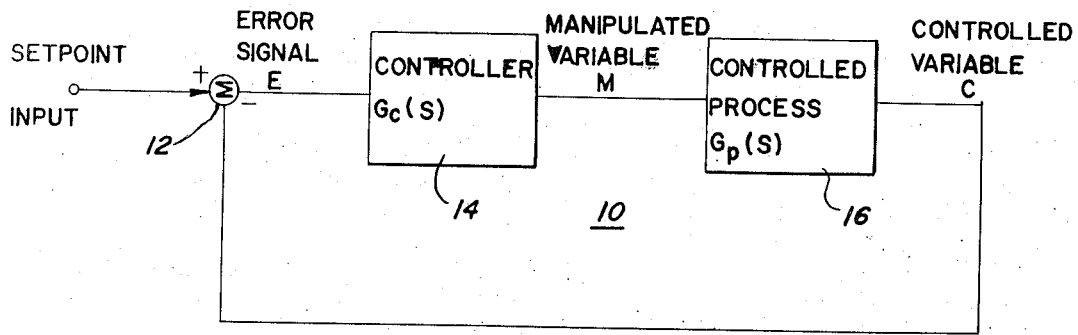
FIG. 1 is a block diagram of a generalized control system in which this invention may be used.

A generalized control system 10 is shown in FIG. 1. In that system, a setpoint signal representative of the desired value of the controlled variable is applied to a positive input of adder 12 and a signal representative of the controlled variable is applied to a negative input of adder 12. The adder effectively subtracts the controlled variable from the setpoint to form an error signal. The error signal is operated on by controller 14 to form a signal representative of a manipulated variable. That signal is then applied as an input to the controlled process 16 and the controlled variable is altered in accord with the manipulated variable.

In a PID controller, the output is, by definition, proportional to the sum of the error signal plus a time integral of the error signal plus a time derivative of the error signal. The output of a PID controller may thus be represented as follows:

$m(t) = K_p [e(t) + (1/\tau_i) \delta e(t)dt + \tau_d(de(t)/dt)]$ where $m(t)$ = the manipulated variable as a function of time;

$e(t)$ = the error signal as a function of time;

$K_p$ = the proportional gain of the controller;

$\tau_i$ = the reset time of the controller; and $\tau_d$ = the rate time of the controller.

$K_p$, $\tau_i$ and $\tau_d$ are constants determined by the design and tuning of the controller. Since $\tau_i$ and $\tau_d$ determine the relative proportions of the controller output due to the time integral and time derivative signals, they may hereinafter be referred to as the integration constant and the differentiation constant, respectively.

The output of a PID controller may also be represented using the Laplace transform notation. In that notation, the Laplace transform, $L[f(t)]$, in terms of the complex variable s of a function of time, $f(t)$, fulfilling certain well known conditions is $$L[f(t)] = \int_0^\infty f(t)e^{-st}dt = F(s)$$

The output of a PID controller is then $M(s) = E(s) K_p [1 + (1/\tau_i s) + \tau_d s]$ where $M(s)$ = the Laplace transform of the manipulated variable as a function of $s$; and $E(s)$ = the Laplace transform of the error signal as a function of $s$.

$K_p$, $\tau_i$, and $\tau_d$ are the same constants as contained in the expression for $m(t)$ given above.

If the transfer function of the controller is defined as $G_c(s) = [M(s)]/[E(s)]$, then $G_c(s) = K_p [1 + (1/\tau_i s) + \tau_d s]$.

The transfer function of the controlled process may be defined as $G_p(s) = [C(s)]/[M(s)]$ where $C(s)$ = the Laplace transform of the controlled variable as a function of $s$.

The above mathematical relationships are well known and are repeated here merely for convenience of reference. They are of general applicability and apply to all types of PID controllers including electric, hydraulic, pneumatic or mechanical. Further, they may easily be placed in discrete form to make them adaptable for use in digital computers. See, for example, Lopez, Murrill and Smith, "Tuning PI and PID Digital Controllers," Instruments & Control Systems, February, 1969. The relationships, of course, represent the ideal form of a PID controller. Any physical PID controller will deviate from the stated relationships to some extent. However, those relationships are still very useful as approximations to the performance of a PID physical controller.

In designing a control system using a PID controller, it will be apparent that the values of $K_p$, $\tau_i$, and $\tau_d$ which are selected will have an effect on the operation of the system. The values of these constants required to optimize the operation of a particular control system will depend on the nature of the transfer function of the controlled process, $G_p(s)$. Moreover, the values required will also depend on the criteria by which optimum performance is measured.

Figure 2:
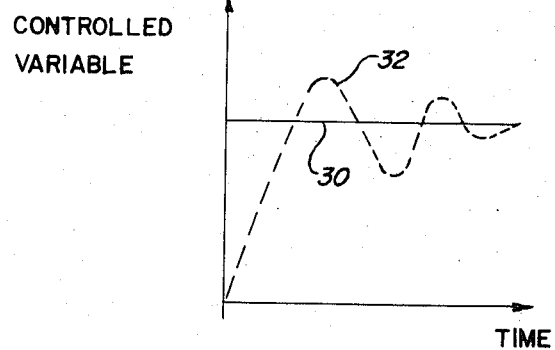
FIG. 2 is a diagram showing the response of a control system such as that shown in FIG. 1 for use in explaining this invention.

One possible form of response of a control system such as that shown in FIG. 1 is presented at FIG. 2. In that figure, the abscissa represents time and the ordinate represents the controlled variable. If there is an instantaneous, step increase in the setpoint input, the ideal response of the controlled variable is shown by solid line 30. The actual response of the controlled variable may have the form shown by dashed line 32. The error function is the difference in the values represented by lines 30 and 32. In any particular control system, the optimum performance may be defined as that which minimizes the total absolute value of error, i.e., the integral of the absolute error, in response to a step change in the setpoint. This criterion is referred to as the IAE criterion. Optimum performance may be defined as that which minimizes the time integral of the squared error signal, the ISE criterion. It may be defined as that which minimizes the time integral of the product of time and absolute error, the ITAE criterion. Alternatively, it may be defined as that performance which minimizes the settling time, i.e., that period required for the response to stabilize between two fixed values above and below the setpoint. The choice of the definition of optimum response is normally based on knowledge of the controlled process and limitations placed upon its operation.

Numerous studies concerning the optimization of control systems using PID controllers have been performed in the past. In accord with the principles of this invention, it may be concluded from many such studies that control systems using PID controllers with a broad range of types of controlled processes may be optimized by placing the reset time and the rate time in a fixed relationship. A number of such studies and the optimum values of the ratio $\tau_d/\tau_i$ which may be derived therefrom are presented in list form below. References to the literature where the studies are reported are also included.

| STUDY | $\tau_d/\tau_i$ |
|---|---|
| Ziegler-Nichols (open loop) [1,2] | 0.25 |
| Cohen-Coon (open loop) [1] | 0.125–0.175 |
| 3-Constraint (open loop) [1] | 0.25–0.50 |
| Ziegler-Nichols Ultimate Period (closed loop) [1,2] | 0.25 |
| Damped Oscillation (closed loop) [2] | 0.25 |
| Gallier-Otto formulas (IAE criterion) [3] | 0.12–0.25 |
| Murrill-Smith formulas (ITAE criterion) [1] | 0.22–0.32 |
| Murrill-Smith formulas (ISE criterion) [1] | 0.35–0.60 |

[1] Murrill, P. W., *Automatic Control of Processes*, International Textbook Company, Scranton, Pennsylvania (1967)
[2] Harriott, Peter, *Process Control*, McGraw-Hill Book Company, New York (1964)
[3] Gallier, P. W., and Otto, R. E., "A Self-Tuning Method for Direct Digital Control", *Instrumentation Technology*, February, 1968, pp. 65–70

Figure 3:
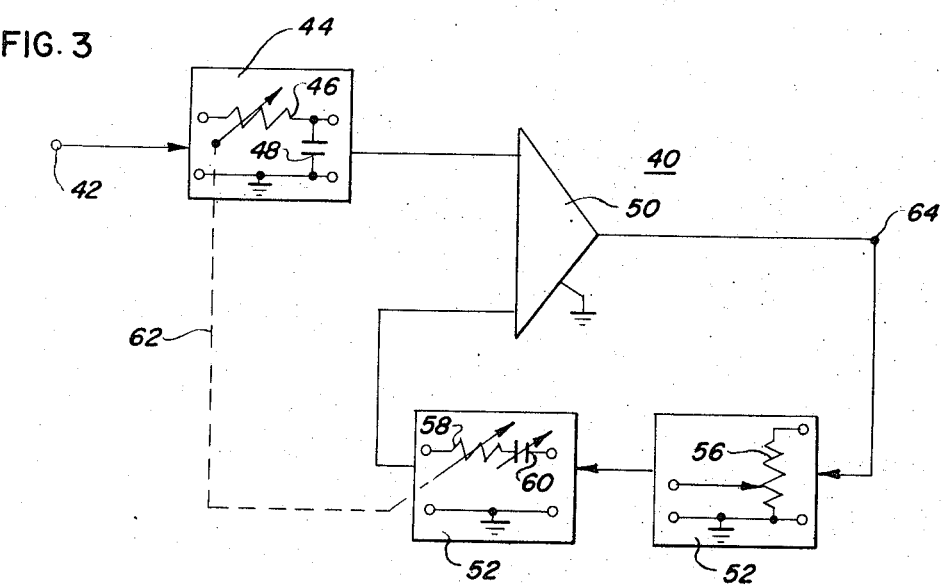
FIG. 3 is a diagram, partly in block form and partly in schematic form, of a control system using one embodiment of this invention.

A PID controller 40 incorporating a preferred embodiment of this invention is disclosed in FIG. 3. The error signal is applied to an input 42 of the controller. That signal is coupled to a reset network 44 which effectively integrates the error signal. The reset network is indicated schematically as being comprised of a variable resistor 46 and a capacitor 48. The output of reset network 44 is coupled to a first input of an operational amplifier 50. An output of operational amplifier 50 is applied through a proportional network 52 and a rate network 54 to a second input of operational amplifier 50. Proportional network 52 is indicated schematically as comprising a potentiometer 56 for adjusting the magnitude of the signal present at the output of amplifier 50 which is returned to the second input thereof. Thus, the proportional network may be used to adjust the gain of the controller. Rate network 54 effectively differentiates the error signal applied to the controller input 42. The rate network is indicated schematically as being comprised of a variable resistor 58 and a variable capacitor 60. Variable resistor 58 in rate network 54 is mechanically ganged to variable resistor 46 in reset network 44, as indicated by the dashed line 62 in FIG. 3. If variable resistors 46 and 58 are of the conventional variety, each comprising a circularly shaped, linearly tapered, resistance element with a wiper arm centrally pivoted with respect thereto and arranged to sweep across the resistance element, the mechanical ganging may be achieved by placing the wiper arms of the two variable resistors on a common control shaft. In the apparatus of FIG. 3, the reset time is equal to the product of the resistance of resistor 46 and the capacitance of capacitor 48 and the rate time is equal to the product of the resistance of resistor 58 and the capacitance of capacitor 60. The reset time and rate times may also be seen to be equal to the time constants of their respective networks. The output of controller 40 is taken from an output terminal 64 coupled to the output of operational amplifier 50.

As will be apparent to those skilled in the control system art, potentiometer 56 in proportional network 52 permits convenient adjustment of the proportional gain through the controller, $K_p$. Reset network 44 permits convenient adjustment of the reset time, $\tau_i$, through adjustment of the circuit value of variable resistor 46. Rate network 54 permits convenient adjustment of the rate time, $\tau_d$, through adjustment of the circuit value of variable resistor 58. In the reset and rate networks, equivalent changes in the reset and rate times could also be achieved by adjustment of the circuit values of capacitors 48 and 60, respectively, and those elements could also be made variable and ganged together.

Moreover, it will be seen that by ganging variable resistors 46 and 58 together, the reset and rate times may be adjusted simultaneously. Further, the reset and rate times are adjusted in proportionate amounts. As the reset time is increased or decreased, the rate time will be increased or decreased a corresponding amount so that the times remain in a fixed ratio. That fixed ratio may also be conveniently altered by selecting an appropriate value for variable capacitor 60.

When it is desired to tune the controller of FIG. 3, the criteria for optimum performance may first be selected. This selection will yield a relationship between $\tau_d$ and $\tau_i$ which should be maintained, and, in particular, may give a required value of $\tau_d/\tau_i$ as indicated from the table above. If so, variable capacitor 60 should then be adjusted to yield the desired ratio. Alternatively, it may be convenient to observe from the table the recurrence of the value 0.25 for the ratio of rate time to reset time to optimize the performance of the control system. Capacitor 60 may then be selected to fix that ratio at 0.25. However, once the ratio is determined, only two tuning adjustments must be made. The proportional gain must be selected. Control system operators normally have little trouble making this adjustment by observation of the controlled system. The controller times must also be determined. This is often most conveniently done by selecting the proper reset time. Again, this is an adjustment which control system operators have little difficulty making. The rate time required to optimize the performance of the system is then selected automatically.

Two commercially available electronic controllers with which the present invention may be used are the Motorola Model 55RC Control Station as described in Instruction Manual M5504.4 of Motorola Instrumentation and Control Inc., P.O. Box 5409, Phoenix, Ariz. (June, 1967) and the General Electric Type 549-13 DDC Controllers as described in General Electric Service Manual 4533K49-305. Resistance-capacitance networks are included in both these controllers to provide the desired integrating and differentiating actions. Further, each has variable resistances to alter the reset and rate times. As described above, this invention may be applied to either of those controllers by physically ganging together the variable resistances in the reset and rate networks.

It will thus be seen that method and apparatus for tuning a PID controller have been provided which fulfill all of the above-mentioned objects. In particular, a PID controller has been provided which, once the criteria for optimum performance has been selected, requires only two tuning adjustments. Further, the two adjustments which are required are ones which relatively unskilled personnel are normally able to make.

It will be obvious that many modifications of the specific embodiment shown may be made without departing from the spirit and scope of this invention. For example, the reset and rate networks may take on a variety of configurations and may be placed in the controller apparatus at a variety of locations. Further, this invention is applicable to a wide variety of controllers including pneumatic, hydraulic, mechanical, and digital controllers.

While a particular embodiment of this invention is shown above, it will be understood, of course, that the invention is not to be limited thereto, since many modifications may be made. It is contemplated, therefore, by the appended claims, to cover any such modifications as fall within the true spirit and scope of this invention.

I claim:

1. A controller apparatus for use in a control system and operative to regulate the value of a controlled variable in said system and comprising:
   signal generation means for generating a controller output signal related to the difference between the value of said controlled variable and a set point value of said controlled variable;
   reset means coupled to said signal generation means for altering said controller output signal in response to a time integral of said difference between the value of said controlled variable and the set point value of said controlled variable;
   reset adjustment tuning means for altering the integration constant of said reset means;
   rate means coupled to said signal generation means for altering said controller output signal in response to a time derivative of said difference between the value of said controlled variable and the set point value of said controlled variable;
   rate adjustment tuning means for altering the differentiation constant of said rate means; and
   ganging means for coupling said reset adjustment tuning means and said rate adjustment tuning means and providing simultaneous alteration of said reset means integration constant and said rate means differentiation constant.

2. The controller apparatus of claim 1 wherein said ganging means further provides for simultaneous alteration of said integration and differentiation constants in proportionate amounts.

3. A controller apparatus for use in a control system and operative to regulate a controlled variable in said system and comprising:
   signal generation means for generating a controller output signal related to the difference between the value of said controlled variable and a set point value of said controlled variable;
   reset means coupled to said signal generation means for improving the steady state error characteristics of said control system;
   reset adjustment tuning means coupled to said reset means for altering the response characteristics of said reset means;
   rate means coupled to said signal generation means for improving the transient response of said control system;
   rate adjustment tuning means coupled to said rate means for altering the response characteristics of said rate means; and
   ganging means coupling said reset adjustment tuning means and said rate adjustment tuning means for simultaneously altering the response characteristics of said reset means and said rate means.

4. An electronic controller apparatus for use in a control system and operative to regulate a controlled variable in said system and comprising:
   amplifier means for receiving an error signal related to the difference between the value of said controlled variable and a setpoint value of said controlled variable and generating a controller output signal in response to said error signal;
   reset circuit means coupled to said amplifier means for generating a signal related to a time integral of said error signal;
   reset adjustment tuning means for altering a time constant of said reset circuit means;
   rate circuit means coupled to said amplifier means for generating a signal related to a time derivative of said error signal;
   rate adjustment tuning means for altering a time constant of said rate circuit means;
   coupling means for coupling said reset adjustment tuning means to said rate adjustment tuning means so that said time constants of said reset circuit means and said rate circuit means are altered simultaneously.

5. The controller apparatus of claim 4 wherein said coupling means comprises ganging means mechanically coupling said reset adjustment tuning means and said rate adjustment tuning means so that said time constants of said reset circuit means and said rate circuit means are simultaneously altered in proportionate amounts.

6. An electronic PID controller apparatus for use in a control system and operative to regulate a controlled variable in said system and comprising:

amplifier means for receiving an error signal related to the difference between the value of said controlled variable and generating a controller output signal in response to said error signal;

reset circuit means coupled to said amplifier means for altering said controller output signal in response to a time integral of said error signal and comprising a first resistive impedance element and a first reactive impedance element;

reset adjustment tuning means coupled to said reset circuit means for altering the relative circuit values of said first impedance elements;

rate circuit means coupled to said amplifier means for altering said controller output signal in response to a time derivative of said error signal and comprising a second resistive impedance element and a second reactive impedance element;

rate adjustment tuning means coupled to said rate circuit means for altering the relative circuit values of said second impedance elements; and coupling means between said reset adjustment tuning means and said rate adjustment tuning means and providing for the simultaneous alteration of the relative values of said first and second impedance elements by proportionate amounts.

7. The electronic PID controller apparatus of claim 6 wherein said first and second resistive impedance elements are first and second resistors, said first and second reactive impedance elements are first and second capacitors, said reset and rate adjustment tuning means are adjustable taps on said first and second resistors, and said coupling means comprises apparatus for mechanically ganging said first and second adjustable taps together.

8. The electronic PID controller apparatus of claim 7 further comprising means for adjusting the relative values of said first and second reactive impedance devices.

9. The method of tuning the reset and rate parameters of a PID controller in a control system comprising the steps of:

placing said reset and rate parameters in a fixed ratio;

tuning one of said parameters to improve the operation of said control system; and tuning the other of said parameters so as to maintain said reset and rate parameters in said fixed ratio.

10. The method of tuning the reset, rate and gain parameters of a PID controller in a control system comprising the steps of:

placing said reset and rate parameters in a fixed ratio;

tuning said reset parameter to optimize the operation of said control system;

tuning said rate parameter so as to maintain said reset and rate parameters in said fixed relationship; and tuning said gain parameter to optimize the operation of said control system.

11. The method of tuning the reset and rate parameters of a PID controller in a control system to optimize the operation of said control system in accord with a predetermined definition of optimization, said definition yielding a fixed relationship between said reset and rate parameters, comprising the steps of:

setting said reset and rate parameters to said fixed relationship;

tuning said reset parameter to optimize the operation of said control system; and tuning said rate parameter so as to maintain said reset and rate parameters in said fixed relationship.

12. The controller apparatus of claim 2 further comprising proportionality adjustment means for altering the ratio of the rate time to the reset time.

13. The controller apparatus of claim 5 further comprising proportionality adjustment means for altering the ratio of the rate time to the reset time.

14. The controller apparatus of claim 5 wherein the ratio of the rate time to the reset time is 0.25.

15. The controller apparatus of claim 13 wherein said proportionality adjustment means alters the ratio of the rate time to the reset time over a plurality of values within the range of 0.125 and 0.60.

* * * * *